United States Patent
Glejbol et al.

(10) Patent No.: US 6,978,806 B2
(45) Date of Patent: Dec. 27, 2005

(54) ARMORED, FLEXIBLE PIPE AND USE OF SAME

(75) Inventors: Kristian Glejbol, Glostrup (DK); Jan Christian Rytter, Copenhagen (DK)

(73) Assignee: NKT Flexible I/S, Brundby (DK)

( * ) Notice: Subject to any disclaimer, the term of this patent is extended or adjusted under 35 U.S.C. 154(b) by 0 days.

(21) Appl. No.: 10/181,516

(22) PCT Filed: Jan. 3, 2001

(86) PCT No.: PCT/DK01/00002

§ 371 (c)(1),
(2), (4) Date: Nov. 13, 2002

(87) PCT Pub. No.: WO01/51839

PCT Pub. Date: Jul. 19, 2001

(65) Prior Publication Data

US 2003/0121559 A1 Jul. 3, 2003

(30) Foreign Application Priority Data

Jan. 14, 2000 (DK) .................................. 2000 00062

(51) Int. Cl.$^7$ ................................................ F16L 11/04
(52) U.S. Cl. ....................... 138/134; 138/135; 138/133; 138/138
(58) Field of Search .................... 138/134, 135, 138/133, 129, 138, 132, 130, 127, 131, 143

(56) References Cited

U.S. PATENT DOCUMENTS

| | | | |
|---|---|---|---|
| 3,830,261 A | * | 8/1974 | Hochberg et al. ............ 138/127 |
| 4,344,462 A | | 8/1982 | Aubert et al. ............... 138/130 |
| 4,402,346 A | * | 9/1983 | Cheetham et al. ........... 138/129 |
| 4,657,049 A | * | 4/1987 | Fourty et al. ............... 138/133 |
| 4,929,478 A | * | 5/1990 | Conaghan et al. .......... 428/35.1 |
| 5,275,209 A | * | 1/1994 | Sugier et al. ............... 138/135 |
| 5,406,984 A | * | 4/1995 | Sugier et al. ............... 138/135 |
| 5,669,420 A | | 9/1997 | Herrero et al. ............. 138/135 |
| 5,730,188 A | | 3/1998 | Kalman et al. ............. 138/135 |
| 6,098,667 A | * | 8/2000 | Odru .......................... 138/134 |
| 6,338,365 B1 | * | 1/2002 | Odru .......................... 138/134 |
| 6,408,891 B1 | | 6/2002 | Jung et al. .................. 138/127 |

FOREIGN PATENT DOCUMENTS

EP 0903527 A1 3/1999

* cited by examiner

*Primary Examiner*—Patrick Brinson
(74) *Attorney, Agent, or Firm*—Kilpatrick Stockton, LLP

(57) ABSTRACT

A flexible, armoured pipe has an impermeable inner liner (3), which is surrounded by at least two reinforcement layers (5, 6, 7, 8). Between the reinforcement layers an impermeable membrane (10) is provided, which ensures that fluids do not permeate into the inner reinforcement layers (5, 6) from the pipe's outer reinforcement layers (7, 8). The outer layers are not isolated from influence from the surrounding environment. Moreover, the outer layers (traction reinforcement layers) are protected against the damaging effect of gases, which are diffused out through the flexible pipe. On the outside of the outer traction reinforcement layers (7, 8) a layer (11) can be applied, which is easily permeated by the surroundings, and which protects the traction reinforcement layer against mechanical influences. In this way it is ensured that the pressure reinforcement can absorb forces both from inner as well as outer pressure.

17 Claims, 1 Drawing Sheet

ARMORED, FLEXIBLE PIPE AND USE OF SAME

Figure 1:
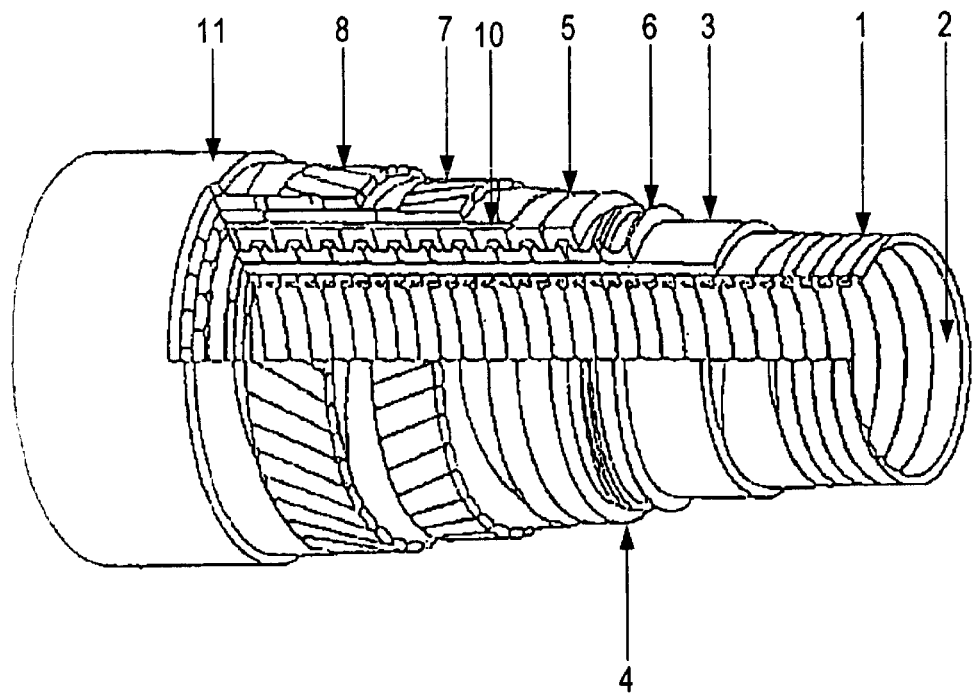

The present invention concerns a flexible, armoured pipe which comprises an inner liner with an inner and an outer surface, said outer surface being surrounded by at least one inner and one outer reinforcement layer.

The invention also concerns the use of the pipe.

Such a pipe comprises an inner liner which forms a barrier against the outflow of the liquid which flows through the pipe, said inner liner being surrounded by a cavity in which a number of helically-wound, pressure-reinforcement profiles are arranged, and where the individual pressure-reinforcement profiles are wholly or partly surrounded by a free volume.

The pressure-reinforcement layer is not chemically bound to the inner liner, but can move freely in relation to this, which ensures the flexibility of the pipe.

Since the individual elements of the pipe are not chemically bound to one another, this type of pipe is referred to in the literature as "unbonded".

Outside the pressure-reinforcement layer a plurality of traction-reinforcement profiles are wound, the individual traction-reinforcement profiles being wholly or partly surrounded by a free volume.

The above-mentioned type of pipe is used, among other things, for the transport of oil and gas in deep waters or waters of varying depth. The above-mentioned construction is especially suitable for the transport of oil from offshore oil wells to installations on the surface of the sea where the oil is refined, or is sent further for processing.

The construction of pipes with functions similar to the above is known, for example, from JP3265781, which describes a reinforced flexible pipe where the whole of the reinforcement is surrounded by an impermeable sheath which prevents the ingress of fluids from the surroundings to the reinforcement layer of the pipe, which provides the advantage that the pipe reinforcement can absorb forces stemming both from inner as well as outer pressure.

Conversely, U.S. Pat. No. 4,402,346 describes a pipe where the reinforcement is surrounded by a permeable outer sheath, which provides the advantage that aggressive gases which are diffused out through the inner liner do not accumulate in the reinforcement layer.

However, a problem in connection with this type of pipe is that fluids will permeate through the outer sheath and exercise a hydrostatic pressure in the reinforcement layer and herewith on the inner liner, corresponding to the pressure of the surroundings, whereby the surrounding pressure will be able to crush the inner liner.

Finally, from NO B 301733 a flexible pipe is known, which is surrounded by an impermeable outer sheath, where between the pressure reinforcement and the traction reinforcement there is an impermeable anti-friction capsule, the function of which is to provide an electrical insulation (out of regard for the avoidance of galvanic corrosion) between the traction and the pressure reinforcement.

Since the outer sheath of the flexible pipe described in NO B 301733 is impermeable, the transport of fluids between the outer reinforcement layer and the surroundings is prevented. This impermeability is critical if the outer reinforcement is made of a material which is not resistant to the fluids which may be diffused out into the outer reinforcement layer from the inside of the pipe.

It is the object of this invention to provide a pipe where the resistance against crushing of the inner liner as a consequence of the pressure of the surroundings is maintained, while at the same time the traction reinforcement of the pipe is protected against the damaging effect of gases, which emanate through the inner liner of the pipe.

The object of the invention is achieved in that the inner reinforcement layers are separated from the outer reinforcement layers by an impermeable membrane, and in that the outer reinforcement layer is wholly or partly in contact with the surrounding environment.

Around the inner reinforcement layer (the pressure reinforcement layer) an impermeable membrane is thus laid, which membrane ensures that fluids do not penetrate into this layer from the pipe's outer layer.

By preventing the migration of fluids from the pipe's outer layer into the pressure reinforcement layer, it is ensured that the pressure reinforcement can absorb forces from inner pressure as well as from outer pressure stemming from the surroundings.

In other words, counteraction is provided against the effect of the hydrostatic pressure on the inner liner.

At least one reinforcement layer, which absorbs axial forces, is wound on the outer side of the impermeable membrane. This reinforcement, which among other things absorbs tractive forces arising from the pipe's inner pressure, is referred to in the literature as traction reinforcement.

Like the pressure reinforcement, the traction reinforcement is formed by the winding of profiles, though here with a relatively low angle in relation to the longitudinal axis of the pipe, so that these profiles mainly absorb axial forces.

On the outside of the traction reinforcement layer, according to one aspect of the invention a permeable layer is applied, which allows passage partly of fluids which exist outside the pipe.

In this way it is ensured that the concentration of injurious elements which emanate from the inside of the pipe out into the traction reinforcement is at all times lower than the highest permissible limit.

If the pipe is used in water, an effective cooling of the traction reinforcement layer is also ensured, so that this is not damaged as a consequence of being heated by the fluid, which is transported through the pipe.

Finally, the traction reinforcement layer is protected against mechanical influences.

As mentioned, the invention also concerns an application of the pipe as a part component in a system for the extraction or refining of mineral oil or gas.

Figure 2:
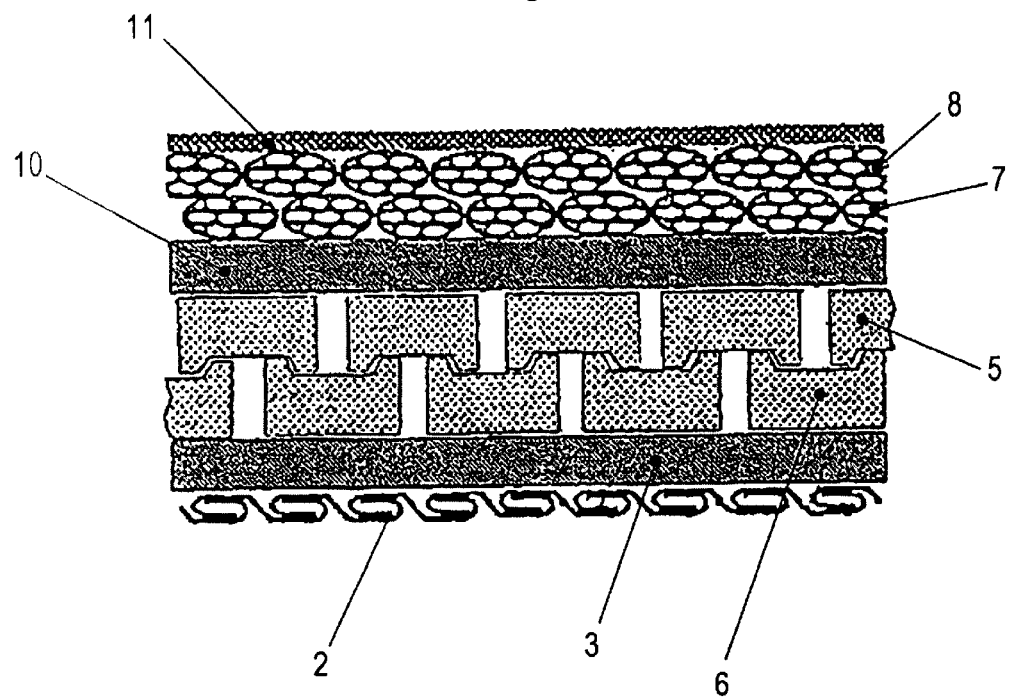

The invention will now be explained in more detail with reference to an example embodiment shown in the drawing, in that FIG. 1 shows the construction of a commonly-known pipe partly in section, while FIG. 2 shows a section through the wall of a pipe according to the invention.

In FIG. 1, the reference number 3 indicates an inner liner, which surrounds a carcass 1, the object of which is to prevent the collapse of the inner liner 3 if the pressure difference between its outer and inner side exceeds that pressure which the inner liner 3 itself can tolerate.

The carcass 1 consists of a metal band 2 which is wound in a helical manner so that it forms an inner pipe, and where the metal band is formed with lobes which engage with each other during the winding-up, so that they lock the individual windings in the helically wound band to each other in such a way that the carcass 1 can be bent out of its longitudinal direction.

In that the carcass 1 itself is not impermeable, the surrounding inner liner 3 serves wholly or partly to prevent fluid or gas from flowing from the inside of the pipe out into the inner reinforcement layer.

It is obvious that although it is shown here as a separate unit, the liner 3 can be a more or less integrated part of the above-mentioned carcass.

The metal band 2, which constitutes the carcass 1, is most frequently of stainless steel, although the use of other metal alloys and pure metals can be envisaged. The liner 3 can be made of a thermoplastic material, most often selected from among the group consisting of polyamides, polyolefins, polyketones or polyvinylidene difluoride, polyvinylidene trifluoride, a mixture of these, or a cross-bound variant of one of the foregoing possibilities, but many other materials can be used.

It should be noted that in certain situations pipes could appear, which do not contain a carcass.

The liner can be built up either as one layer or as several polymeric layers with identical or different characteristics, which are extruded on the outside of one another.

Hereafter, one or several layers of reinforcement profiles 5,6 are wound in a helical manner on the outside of the inner liner 3, which reinforcement profiles form windings with a very small pitch in relation to the longitudinal direction of the pipe. These reinforcement profiles constitute the pipe's pressure reinforcement.

The windings create great resistance against the liner 3 being crushed as a consequence of a high positive pressure difference between the inside and the outside of the inner liner.

If the pressure reinforcement layer 5, 6 is shielded from the outer environment, as it is by an outer sheath 9 as shown in FIG. 2, this will also protect the inner liner 3 against crushing as a result of the hydrostatic pressure of the surroundings.

In order to ensure the layer's flexibility, this is configured so that it contains a certain free volume. In this way, the flexibility of the layer is ensured.

As can be seen from the figure, the profiles which constitute the pressure reinforcement 5,6 consist of C-shaped profiles, these profiles being oriented in such a manner that two layers of windings, which are wound around the liner 3 in the same direction, engage each other.

However, other types of profiles, such as e.g. Z-shaped C-shaped, K-shaped, X-shaped and T-shaped profiles are often used for the same purpose.

Many materials can be used for the manufacture of the profiles, which constitute the pressure reinforcement, but use is most often made of metals, preferably carbon steel or titanium alloy, ceramics, or a mixture thereof.

In that pressure build-up and pollution can arise in this layer as a consequence of diffusion of gas into it, use is made of conventional methods described in the literature in order to ensure cleaning and removal of condensation and gases, which have accumulated in this layer.

On the outside of the pressure reinforcement 5,6 a further reinforcement layer 7,8 is arranged, which consists of one or several layers of profiles 7,8 or bands which are wound in a helical manner with a considerably greater pitch than the above-mentioned pressure reinforcement profiles 5,6.

In the following, these profiles or bands are referred to as traction reinforcement. By winding with a high pitch, it is ensured that the traction reinforcement can effectively absorb the tractive forces in the longitudinal direction of the pipe, which can arise during the laying-out or operation of the pipe.

Out of regard for ensuring the flexibility of the pipe, the individual traction reinforcement elements are normally disposed so that there is clearance between their windings.

Between the above-mentioned traction reinforcement elements, there can also be placed layers of a material with the object of preventing tearing or wear between adjoining traction reinforcement elements when the pipes are bent.

The traction reinforcement elements 7,8 can be made of many materials, merely providing that these possess the necessary tensile strength to resist uni-axial tensile stresses and to ensure the function of the pipe. However, in that the profiles 7,8 are essentially exposed to the surrounding environment, it is an advantage that these are selected from among materials, which are not damaged by the surrounding environment.

For use in seawater, traction reinforcement elements made of fibre-reinforced polymers or alloys based on titanium are especially suitable. In a specially preferred embodiment, the traction reinforcement elements mentioned here are pre-formed before the winding, so that after being wound they lie substantially free of mechanical stresses in the pipe.

In one embodiment, the individual profiles are coated with an elastic material before being applied, the object of which is to reduce the effect of sudden point-loading arising from blows on the outer side of the pipe.

The reference numbers in FIG. 2, which are also used in FIG. 1, indicate construction details, which are identical for the two figures. Therefore, these will not be discussed in detail.

In comparison with the pipe in FIG. 1, around the pressure reinforcement layer 5,6 on the pipe according to FIG. 2 an impermeable membrane 10 is applied, the object of which is to prevent the ingress of fluids from the pipe's surroundings to the pressure reinforcement layer 5,6. This function is important, in that all layers outside the centremost sheath are substantially exposed to the surrounding environment. Therefore, the impermeable membrane 10 must function as a transport barrier between the surroundings and the pressure reinforcement. The impermeable membrane is characteristic in that it is produced from an extruded thermoplastic material, and is essentially impervious to fluids.

Preferred types of plastics are to be found in the group consisting of polyamides, polyolefins, polyketones, polyphenyl sulphide, polyvinylidene difluoride, polyvinylidene trifluoride, a mixture of these, a cross-bound or a softened variant of one of the foregoing possibilities although many other types of plastic and mixtures hereof will also be suitable. The membrane 10 can be built up either as one layer or as several polymeric layers with identical or different characteristics which are extruded around one another.

In order to ensure that the traction reinforcement elements 7,8 are held in place, and also for the protection of these elements, an outer layer 11 can be applied outermost on the pipe. This outer layer is easily permeated by the surrounding environment, so that it does not to any great degree prevent contact between the surrounding environment and the traction reinforcement elements.

The outer layer can expediently be produced from an extruded thermoplastic material, which is perforated, either during or after the production.

In a second preferred embodiment, the outer layer is made of a plaited material, e.g. a band made of aramide strips, which are embedded in a thermoplastic matrix.

In another embodiment, the traction reinforcement layer is made of a metal alloy having iron or titanium as its main element. In yet another embodiment the fraction reinforcement layer is made of profiles or strips which are surrounded by a polymeric material.

Still another embodiment of the disclosed pipe comprises a free volume between the inner liner and the impermeable membrane which is arranged to be ventilated or flushed through with a cleaning liquid.

It is obvious that the present invention can be used in ways other than those disclosed in the above, in that there is great freedom for use of the principles of the invention in other connections within the scope of the patent claims.

What is claimed is:

1. Flexible, armoured pipe comprising an inner liner which forms a barrier against outflow of fluid which flows through the pipe and which has an inner and an outer surface, said outer surface being surrounded by at least one inner and at least one outer reinforcement layer, and the at least one inner reinforcement layer is separated from the at least one outer reinforcement layer by an impermeable membrane, wherein the at least one inner reinforcement layer constitutes the pipe's pressure reinforcement layer wherein the at least one outer reinforcement layer includes at least one traction reinforcement layer which mainly absorbs axial forces and is wholly or partly in contact with the surrounding environment.

2. Flexible, armoured pipe according to claim 1, wherein the pressure reinforcement layer is produced from profiles of the type Z, T, C, K or X.

3. Flexible, armoured pipe according to claim 1, wherein the traction reinforcement layer is produced in a material which is resistant to the surrounding environment.

4. Flexible, armoured pipe according to claim 1, wherein the inner liner and the membrane are produced by the extrusion of a thermoplastic material.

5. Flexible, armoured pipe according to claim 1, wherein a permeable layer is applied on the outside of the traction reinforcement layer.

6. Flexible, armoured pipe according to claim 1, wherein a free volume, which exists between the inner liner and the impermeable membrane, is arranged to be ventilated or flushed through with a cleaning liquid.

7. Flexible, armoured pipe according to claim 1, wherein the inner liner is made of a polymer selected from among the group consisting of polyolefins, polyketones, polyamides, polyphenol sulphide, polyvinylidene difluoride, polyvinylidene trifluoride, a mixture of these, or a cross-bound variant of one of the foregoing possibilities.

8. Flexible, armoured pipe according to claim 1, wherein the impermeable membrane is made of a polymer selected from among group consisting of polyolefins, polyketones, polyamides, polyphenol sulphide, polyvinylidene difluoride, polyvinylidene trifluoride, a mixture of these, a cross-bound or a softened variant of one of the foregoing possibilities.

9. Flexible, armoured pipe according to claim 1, wherein the pressure reinforcement layer is made of a material which is resistant to compressive forces, selected from among metals such as steel or titanium alloy, or the ceramics or a mixture hereof.

10. Flexible, armoured pipe according to claim 1, wherein in the inner liner comprises a metal structure placed so as to prevent the collapse of the inner liner.

11. Flexible, armoured pipe according to claim 1, wherein the traction reinforcement layer is made of a material which is resistant to the chemical influence from the outer environment and to uni-axial tensile stresses.

12. Flexible, armoured pipe according to claim 1, wherein the traction reinforcement layer is made of fibre which is embedded in a polymeric material.

13. Flexible, armoured pipe according to claim 1, wherein the traction reinforcement layer is made of a metal alloy having iron or titanium as its main element.

14. Flexible, armoured pipe according to claim 1, wherein the traction reinforcement layer is made of profiles or strips which are surrounded by a polymeric material.

15. Flexible, armoured pipe according to claim 1, further comprising an outer layer made of a plaited sheath.

16. Flexible, armoured pipe according to claim 1, further comprising an outer layer produced by extrusion.

17. Use of the pipe according to claim 1 as a part component in a system for the extraction or refining of mineral oil or gas.

* * * * *